United States Patent
Keller et al.

(10) Patent No.: US 8,508,743 B2
(45) Date of Patent: Aug. 13, 2013

(54) CRANKSHAFT TESTING METHOD

(75) Inventors: Hubert Keller, Constance (DE);
Michael Rudolf, Constance (DE)

(73) Assignee: HOMMEL-ETAMIC GmbH,
Villingen-Schwenningen (DE)

( * ) Notice: Subject to any disclaimer, the term of this patent is extended or adjusted under 35 U.S.C. 154(b) by 184 days.

(21) Appl. No.: 13/041,196

(22) Filed: Mar. 4, 2011

(65) Prior Publication Data

US 2012/0224180 A1    Sep. 6, 2012

(30) Foreign Application Priority Data

Mar. 4, 2011  (DE) .......................... 10 2011 013 089

(51) Int. Cl.
*G01N 21/55* (2006.01)

(52) U.S. Cl.
USPC ......................................................... 356/445

(58) Field of Classification Search
USPC ......................................................... 356/445
See application file for complete search history.

(56) References Cited

U.S. PATENT DOCUMENTS

| | | | |
|---|---|---|---|
| 3,552,820 A | 1/1971 | Brachvogel | |
| 4,394,683 A | 7/1983 | Liptay-Wagner et al. | |
| 4,566,763 A | 1/1986 | Greguss | |
| 5,058,178 A | 10/1991 | Ray | 382/150 |
| 5,473,474 A | 12/1995 | Powell | |
| 5,654,800 A * | 8/1997 | Svetkoff et al. | 356/602 |
| 6,462,815 B1 | 10/2002 | Drabarek et al. | 356/241.1 |
| 6,621,516 B1 | 9/2003 | Wasson et al. | 348/84 |
| 7,164,476 B2 | 1/2007 | Shima et al. | 356/241.1 |
| 2009/0103080 A1* | 4/2009 | Oomori et al. | 356/237.5 |

FOREIGN PATENT DOCUMENTS

| | | |
|---|---|---|
| CH | 660 629 A5 | 5/1987 |
| DE | 31 23 703 C2 | 3/1982 |
| DE | 32 32 904 C2 | 3/1984 |
| DE | 3232904 A1 | 3/1984 |
| DE | 43 20 845 C1 | 10/1994 |
| DE | 44 16 493 A1 | 11/1995 |
| DE | 202 14 856 U1 | 2/2003 |
| DE | 10 2007 031 358 A | 3/2009 |
| EP | 1 321 793 B1 | 6/2003 |
| GB | 2126715 A | 3/1984 |
| WO | WO 2009/003692 A1 | 1/2009 |

OTHER PUBLICATIONS

Kammel, Sören "Deflektometrische Untersuchung spiegelnd reflektierender Freiformflächen" [Deflectometric analysis of specularly reflective free-form surfaces], Institut für Meβ- and Regelungstechnik Karlsruhe (TH), Schriftenreihe Nr. 004 [Institute for Measurement and Control Engineering, University of Karlsruhe (TH), Publication Series No. 004], http://www.uvka.de/univeriag/volltexte/2005/50/, ISSN 1613-4214, ISBN 3-937300-28-7, published 2005 (127 pages).

(Continued)

*Primary Examiner* — Tu Nguyen
(74) *Attorney, Agent, or Firm* — Shlesinger, Arkwright & Garvey LLP.

(57) ABSTRACT

In a crankshaft testing method for the classification testing of at least one bearing surface of a crankshaft or the like, a reflection of a reference object at the bearing surface to be tested (reflection image) is detected by at least one sensor, using a sensor system. The detected reflection image is evaluated with regard to its contrast, and the crankshaft is classified as "unsatisfactory" when the contrast is below a predefined or predefinable threshold value.

12 Claims, 5 Drawing Sheets

(56) References Cited

OTHER PUBLICATIONS

U.S. Appl. No. 12/805,053, filed Jul. 2010, Wegmann.
U.S. Appl. No. 12/923,412, filed Sep. 2010, Arnold.
U.S. Appl. No. 13/041,196, filed Mar. 2011, Keller et al.
U.S. Appl. No. 13/096,375, filed Apr. 2011, Seewig.
U.S. Appl. No. 13/214,764, filed Aug. 2011, Volk.
U.S. Appl. No. 13/073,625, filed Mar. 2011, Arnold.

"Spiegellinsenobjektiv aus Wikipedia, der freien Enzyklopadie" (5 pp.)downloaded Apr. 28, 2009; and Machine translation thereof(5 pp.) (10 pp. total).
"Spiegellinsenobjektiv aus Wikipedia, der freien Enzyklopadie" downloaded Apr. 28, 2009, pp. 1 of 5, 2 of 5, 3 of 5, 4 of 5, and 5 of 5 (5 pgs.).
U.S. Appl. No. 12/662,813, filed May 2010, Keller.

* cited by examiner

# CRANKSHAFT TESTING METHOD

CROSS-REFERENCE TO RELATED APPLICATIONS

This application claims the priority of German application no. 10 2011 013 089.6 entitled "Crankshaft Testing Method" ["Kurbelwellen-Prüfverfahren"], filed Mar. 4, 2011, and which is incorporated herein by reference.

FIELD OF THE INVENTION

The invention relates to a crankshaft testing method for the classification testing of at least one bearing surface of a crankshaft or the like.

BACKGROUND OF THE INVENTION

The production of bearing surfaces of crankshaft bearings (main bearings and pin bearings) is completed in multiple steps. In a first step the bearing surface is milled, and in a second step is ground to size. So-called finishing, which involves a lapping process, is carried out in a third step. In this regard a band-shaped tool (finishing belt) is generally used. Finishing is necessary to produce the desired slide path properties of the bearing surface. Unfinished crankshaft bearings generally fail. When a crankshaft bearing fails, it is necessary to disassemble the entire engine, which entails a high level of effort and correspondingly high costs.

To avoid failure of a crankshaft bearing, within the scope of producing the crankshaft the "finished" state and the "ground" state must be differentiated.

It is known to differentiate the ground/finished states by measuring suitable roughness parameters, for which tactile as well as optical methods are basically suitable.

In this regard, it is known in particular to examine the bearing surfaces using a scattered light sensor. Such a scattered light sensor scans the bearing surface to be tested and makes the ground/finished differentiation by means of a scattered light measurement. It is disadvantageous that such a scattered light measurement is relatively sensitive to fouling of the bearing surface, and at the same time requires high positioning accuracy of the crankshaft. Because such a scattered light sensor measures point by point, it is also necessary to move the scattered light sensor relative to the bearing surface. This requires a corresponding mechanical expenditure of effort.

OBJECTS AND SUMMARY OF THE INVENTION

The object of the invention is to provide a crankshaft testing method for the classification testing of at least one bearing surface of a crankshaft or the like, which is operationally reliable and robust.

This object is achieved by the invention crankshaft testing method for the classification testing of at least one bearing surface of a crankshaft or the like, wherein a reflection of a reference object at the bearing surface to be tested (reflection image) is detected by at least one sensor, using a sensor system, and the detected reflection image is evaluated with regard to its contrast, and the crankshaft is classified as "unsatisfactory" when the contrast is below a predefined or predefinable threshold value.

According to the invention, a reflection of a reference object at the bearing surface to be tested (reflection image) is detected by at least one sensor, using a sensor system, and the detected reflection image is evaluated with regard to its contrast. The crankshaft is classified as "unsatisfactory" when the contrast of the reflection image detected using the sensor is below a predefined or predefinable threshold value. A finished bearing surface has a higher gloss level than one which is merely ground. As a result, the contrast of the reflection image for a finished bearing surface is higher than for a ground bearing surface.

In this manner the invention makes possible operationally reliable testing of crankshafts. One particular advantage of the crankshaft testing method according to the invention, which is also referred to below as the method for short, is that it is robust with respect to positioning inaccuracies of the crankshaft and to fouling of the bearing surface. If fouling is present in the region of the bearing surface which is detected by the image sensor and in which the reference object reflects, the contrast in this region is reduced, but is high in the rest of the region. Based on the high contrast in the rest of the region, the crankshaft or the bearing surface being tested may be classified as "satisfactory." The method according to the invention thus has a high level of redundancy. In this regard, the invention makes use of the fact that within the scope of an operationally reliable test it is basically sufficient to differentiate the "finished" state from the "ground" state, and in principle it is not necessary to recognize intermediate stages, since in practice it has been shown that as a rule a bearing surface is either finished in the desired manner or is not finished at all, for example because the finishing belt is torn. Therefore, intermediate stages between the "finished" and "ground" surface states generally do not occur in practice.

So-called deflectometric methods are known from the field of surface measurement, for example from the dissertation titled "Deflektrometrische Untersuchung spiegelnd reflektierender Freiformflächen" [Deflectometric analysis of specularly reflective free-form surfaces], Sören Kammel, Institut für Meβ-und Regelungstechnik Karlsruhe (TH), Schriftenreihe Nr. 004 [Institute for Measurement and Control Engineering, University of Karlsruhe (TH), Publication Series No. 004], and DE 31 23 703 C2. Such deflectometric methods measure surfaces, while the method according to the present invention examines the surface quality as a whole. In addition, deflectometric methods, in contrast to the method according to the invention, require a reflective surface.

The method according to the invention also includes the testing of metal camshafts, or other metal components which are at least partially rotationally symmetrical, which are subjected to a finishing operation.

One advantageous further embodiment of the invention provides that the reference object is a reference pattern which is imaged over the bearing surface. The reference pattern may, for example, be imprinted on a transparent film and illuminated using a light source.

One advantageous further embodiment of the above-mentioned embodiment provides that the reference pattern is a pattern which is periodic along at least one axis.

To simplify the contrast evaluation carried out according to the invention, another advantageous further embodiment of the invention provides that the reference pattern has a plurality of lines which are spaced apart from one another (line pattern). The lines are preferably essentially equidistant from one another.

Another advantageous further embodiment of the invention provides that the reference pattern is imaged over the bearing surface of the crankshaft to be examined in such a way that the lines extend, at least approximately, in the circumferential direction of the bearing surface. This embodiment makes use of the knowledge that a bearing surface which is essentially cylindrical functions as a cylindrical lens in the optical imaging of the reference pattern. On account of astigmatism, lines which extend in the axial direction of the bearing surface cannot be resolved, whereas the lines which extend in the circumferential direction of the bearing surface may be resolved in a particularly satisfactory manner.

By an appropriate selection of the threshold value, on the basis of which a classification as "satisfactory" or "unsatisfactory" may be made, according to the invention a finished bearing surface may be easily differentiated from an unfinished bearing surface. To make the differentiation in a particularly simple manner, when a line pattern is used in the case of a finished bearing surface, for the contrast evaluation it is desirable to obtain a completely modulated signal, and for an unfinished bearing surface, to obtain an unmodulated or an essentially unmodulated signal. For this purpose, one advantageous further embodiment of the invention provides that the reference object and/or the distance of the reference object from the bearing surface to be tested is/are selected in such a way that for an unfinished bearing surface a contrast of the reflection image results which is below an additional threshold value.

In the method according to the invention, it is advantageous to use at least one digital image sensor. Such sensors are available as relatively simple and inexpensive standard components. In this regard, CMOS image sensors are used which may be read line by line, and which thus provide the option to combine the classification according to the invention with surface testing.

One very advantageous further embodiment of the invention provides that at least two bearing surfaces of the crankshaft are tested, and that an image sensor of the sensor system is associated with each bearing surface to be tested. In this embodiment it is possible to test all bearing surfaces of a crankshaft in a particularly time-saving manner. In particular, in this embodiment the crankshaft to be tested and the image sensors or cameras used may be stationarily mounted during the testing operation.

A crankshaft testing device according to the invention for the classification testing of at least one bearing surface of a crankshaft or the like, has a sensor system having at least one sensor for detecting a reflection of a reference object at the bearing surface to be tested (a reflection image), and has an evaluation device for evaluating the detected reflection image with regard to its contrast, the evaluation device classifying the crankshaft as "unsatisfactory" when the contrast is below a predefined or predefinable threshold value.

Advantages and practical further embodiments of the crankshaft testing device according to the invention further includes that in the crankshaft testing device the reference object is a reference pattern which is imaged over the bearing surface.

Another advantageous and practical further embodiment of the crankshaft testing device according to the invention includes that the reference pattern is a pattern which is periodic along at least one axis.

Another advantageous and practical further embodiment of the crankshaft testing device according to the invention includes that the reference pattern has a plurality of lines which are spaced apart from one another (a line pattern).

Another advantageous and practical further embodiment of the crankshaft testing device according to the invention includes that the reference pattern is imaged over the bearing surface of the crankshaft to be examined in such a way that the lines extend, at least approximately, in the circumferential direction of the bearing surface.

Another advantageous and practical further embodiment of the crankshaft testing device according to the invention includes that the reference object and/or the distance of the reference object from the bearing surface to be tested is/are selected in such a way that for an unfinished bearing surface a contrast of the reflection image results which is below an additional threshold value.

Another advantageous and practical further embodiment of the crankshaft testing device according to the invention includes that the sensor system has at least one digital image sensor.

Another advantageous and practical further embodiment of the crankshaft testing device according to the invention includes that the sensor system has at least two image sensors, each of which is associated with a bearing surface to be tested.

Other advantageous and practical further embodiments of the invention include the use of the crankshaft testing device according to the various embodiments of the invention for carrying out a crankshaft testing method.

Other advantageous and practical further embodiments of the crankshaft testing device according to the invention include use of a crankshaft testing method and/or a crankshaft testing device in accordance with any of the embodiments for the classification testing of at least one bearing surface of a camshaft.

Other advantageous and practical further embodiments of the invention include the use of any of the crankshaft testing device embodiments with any of the crankshaft testing method according to the invention for the classification testing of at least one surface of a metal component which is at least partially rotationally symmetrical.

The wavelength used in the imaging of the reference object over the surface to be tested may be selected in a wide range, depending on the particular requirements. To make a differentiation of a metallic surface of a crankshaft or another metal component with regard to the "finished" and "ground" machining states, according to the invention visible light, for example, may be used. To differentiate between roughly structured surfaces with regard to their machining state, for example for a cast part, to differentiate between the "cast/unground" and "ground" machining states, according to the invention light of longer wavelength may be used, since at such a longer wavelength the surfaces have a higher gloss. If more finely structured surfaces are to be differentiated with regard to their machining state, light of shorter wavelength may be correspondingly used.

The invention is explained below based on one embodiment, with reference to the accompanying highly schematic drawing. All features which are described, illustrated in the drawing, and claimed in the patent claims constitute the subject matter of the invention, taken alone or in any combination, independently of their combination in the patent claims and their dependencies, and independently of their description or illustration in the drawing.

DETAILED DESCRIPTION OF THE INVENTION

Identical or corresponding components are provided with the same reference numerals in the figures of the drawing.

Figure 1:
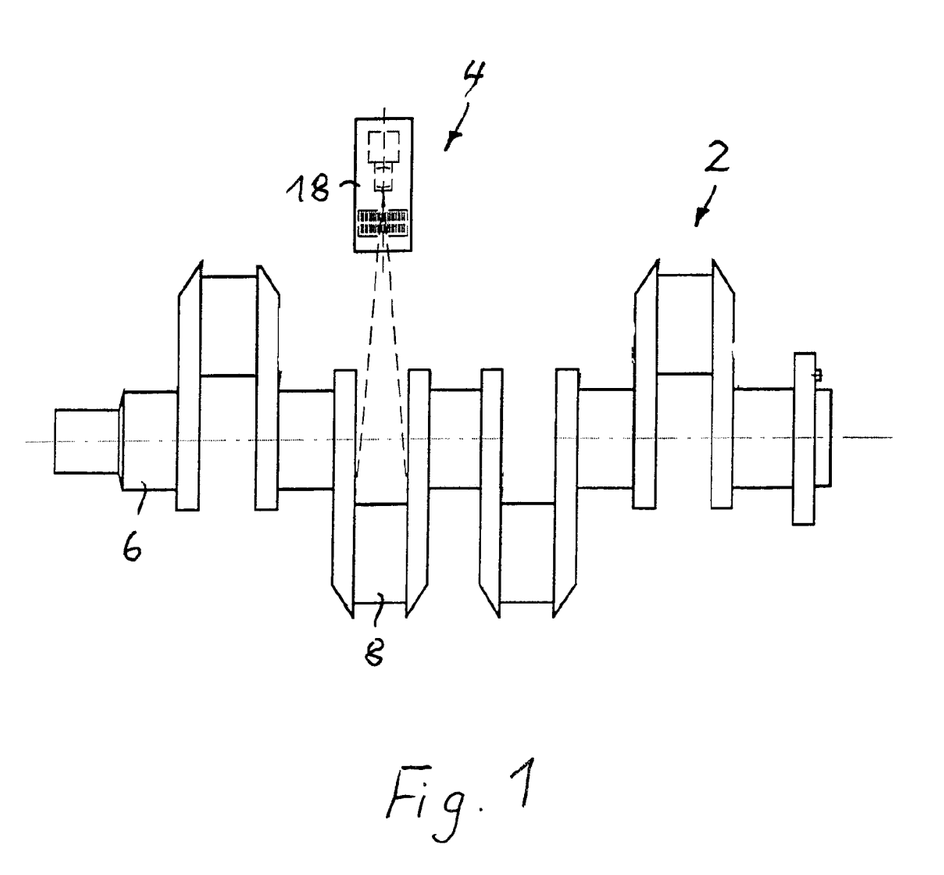
FIG. 1 shows a schematic side view of a crankshaft in combination with a portion of a first embodiment of a crankshaft testing device according to the invention.

FIG. 1 schematically illustrates a crankshaft 2 which is subjected to a crankshaft testing method according to the invention, referred to below as the method for short, for the classification testing of at least one bearing surface of a crankshaft or the like. For carrying out the method according to the invention, an embodiment of a crankshaft testing device 4 according to the invention is used, which is referred to below as the device for short. According to the invention, a test is conducted to determine whether the bearing surfaces of the crankshaft 2 are finished in the desired manner, i.e., have been subjected to finish machining after being ground. This concerns the main bearings of the crankshaft 2, of which only one main bearing denoted by reference numeral 6 is provided for the sake of clarity, as well as the pin bearings, of which only one pin bearing denoted by reference numeral 8 is provided for the sake of clarity.

In the method according to the invention, a reflection of a reference object at the bearing surface to be tested (reflection image) is detected by at least one sensor, using a sensor system. The detected reflection image is evaluated with regard to its contrast, and the crankshaft is classified as "unsatisfactory" when the contrast is below a predefined or predefinable threshold value.

Figure 2:
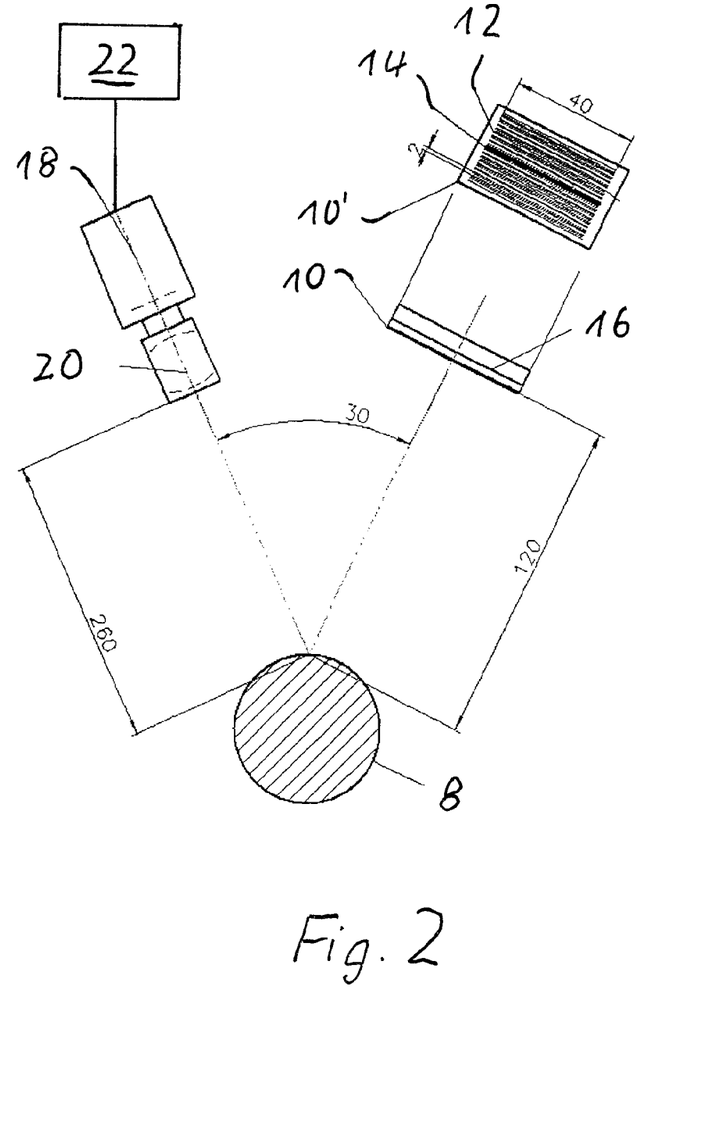
FIG. 2 shows a schematic diagram for illustrating the mode of operation of the embodiment according to FIG. 1.

FIG. 2 schematically illustrates the design of one embodiment of the device 4 according to the invention.

In the illustrated embodiment, a reference pattern 10 which in the illustrated embodiment has a plurality of lines spaced apart from one another which form a line pattern is used as a reference object. In the illustrated embodiment, the line pattern 10 is imprinted on a transparent film. In FIG. 2, reference numeral 10' denotes an illustration of the reference pattern 10 which for elucidation is rotated by 90°. It is apparent that the reference pattern 10 has a plurality of lines 12 of small line thickness which are essentially equidistant from one another, and has a single line 14 of greater line thickness. The lines 12, 14 are imprinted in black ink on the transparent film.

The line pattern 10 is illuminated using a light source 16, which in the present embodiment is formed by an LED panel light.

A reflection of the line pattern 10 at the bearing surface to be tested (reflection image) is detected by at least one digital sensor, using a sensor system. For the device 4 according to FIG. 2, the sensor is formed by a CCD camera 18. A lens 20 is used to focus on the reflection image, in principle it being sufficient for the lens 20, in conjunction with a basic adjustment of the device 2, to focus on the bearing surface to be tested. In principle, refocusing during the testing operation is not necessary.

Situated downstream from the CCD camera is an evaluation device 22 which evaluates the reflection image detected by the image sensor of the CCD camera 18 with regard to the contrast of the reflection image. The evaluation device has a classification device by means of which the crankshaft 2 is classified as "unsatisfactory" when the contrast is below a predefined or predefinable threshold value. The evaluation device 22, in addition to the classification device, may be formed by an evaluation computer. The evaluation device 22 assesses the contrast of the reflection image, i.e., of the line grid in the illustrated embodiment, using numerical image processing methods.

Figure 3:
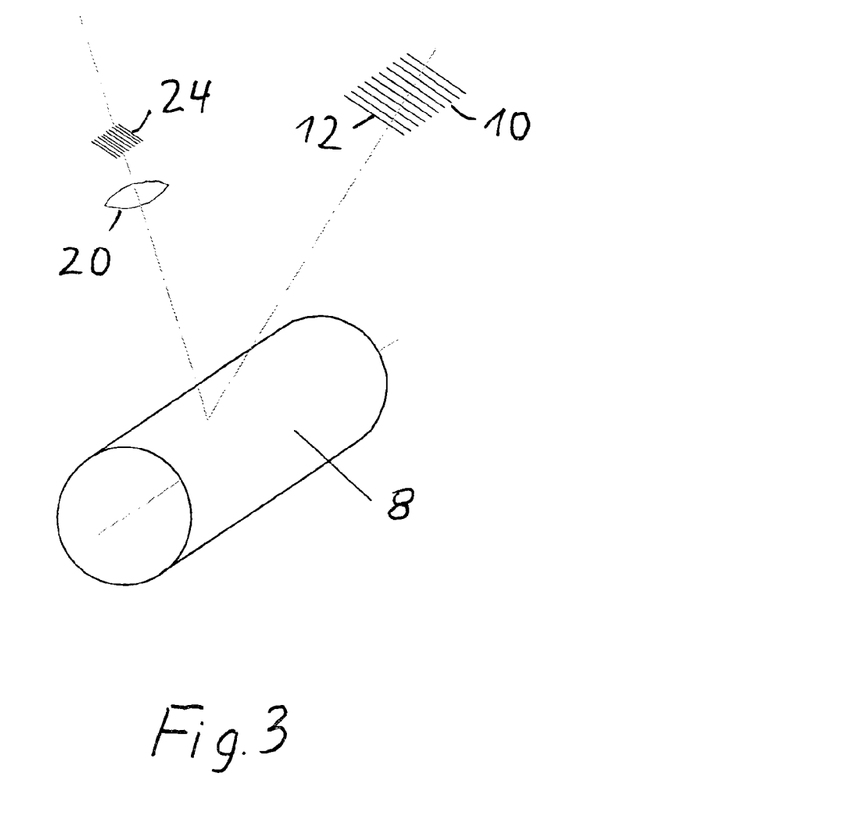
FIG. 3 shows another schematic diagram for further illustrating the mode of operation of the embodiment according to FIG. 1.

FIG. 3 illustrates the configuration of the line pattern 10 relative to the pin bearing 8 to be tested. In the illustrated embodiment, the reference pattern is imaged over the bearing surface of the pin bearing 8 in such a way that the lines 12 extend, at least approximately, in the circumferential direction of the bearing surface. Since the pin bearing 8 forms a cylindrical lens, imaging of the line pattern 10 in such a way that the lines 12 extend in the axial direction of the pin bearing 8 would have the result, on account of astigmatism, that the lines 12 could not be resolved.

For the classification testing of the crankshaft 2, the reflection image of the line pattern 10 on the pin bearing 8 is detected using the CCD camera 18, and the detected reflection image is evaluated with regard to its contrast. The image which is produced on the image sensor of the CCD camera 18 is denoted by reference numeral 24 in FIG. 3.

Figure 4:
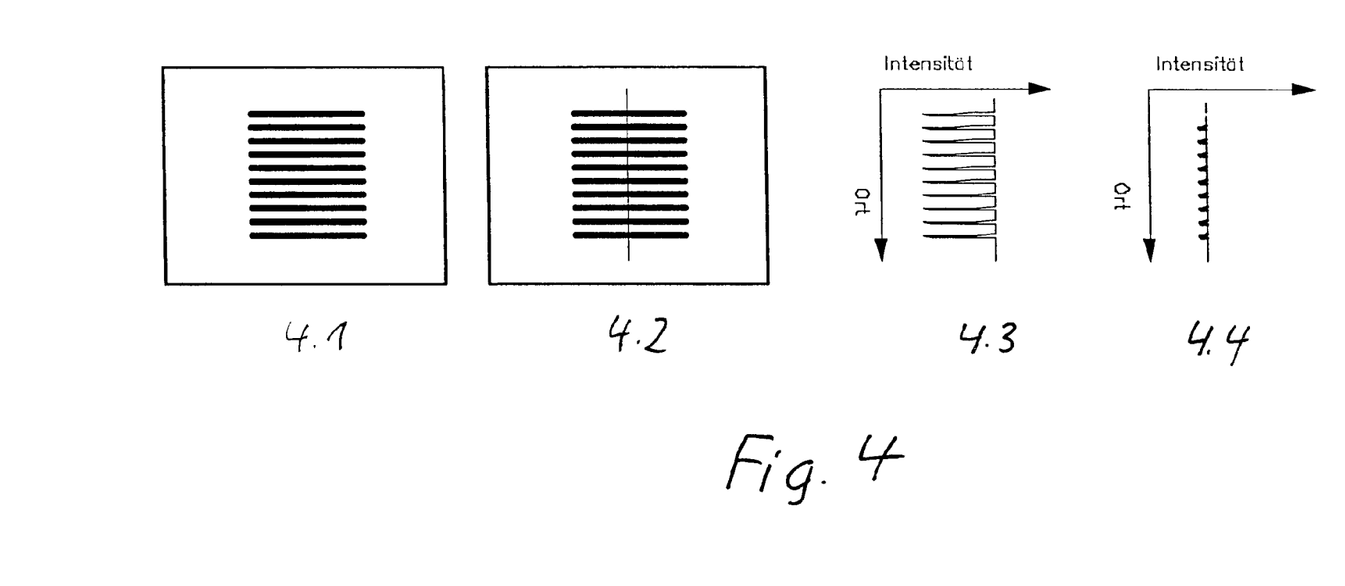
FIG. 4 shows a diagram for illustrating the mode of operation of an evaluation device of the embodiment according to FIG. 1.

FIG. 4 illustrates the evaluation. FIG. 4.1 shows the digital image of the line pattern 10 recorded using the CCD camera 18. FIG. 4.2 illustrates the contrast evaluation of the image. FIG. 4.3 illustrates the intensity curve of a signal which results from evaluation of the detected image with regard to its contrast, specifically, for the case that the bearing surface is finished, i.e., has a high gloss level. In the present case this results in a high contrast. FIG. 4.4 shows an example of the curve of the same signal when the surface is unfinished, but merely has fouling and therefore has a lower gloss level. A much lower contrast results in this case.

The crankshaft 2 or the particular bearing surface examined is classified by comparison with a threshold value. If the determined contrast is below a threshold value, the crankshaft is classified as "unsatisfactory." If fouling is present in the reflection image on the bearing surface in the region of one of the lines, the contrast in this region is reduced. Based on the high contrast in the other regions of the reflection image, the crankshaft 2 may nevertheless be classified as "satisfactory."

The method according to the invention thus makes possible operationally reliable and rapid classification of metal crankshafts, camshafts, or other test pieces which are at least partially rotationally symmetrical. In this regard, the method according to the invention is robust with respect to fouling of the bearing surface to be tested, and with respect to positioning inaccuracies of the crankshaft 2 relative to the device 4 according to the invention.

Figure 5:
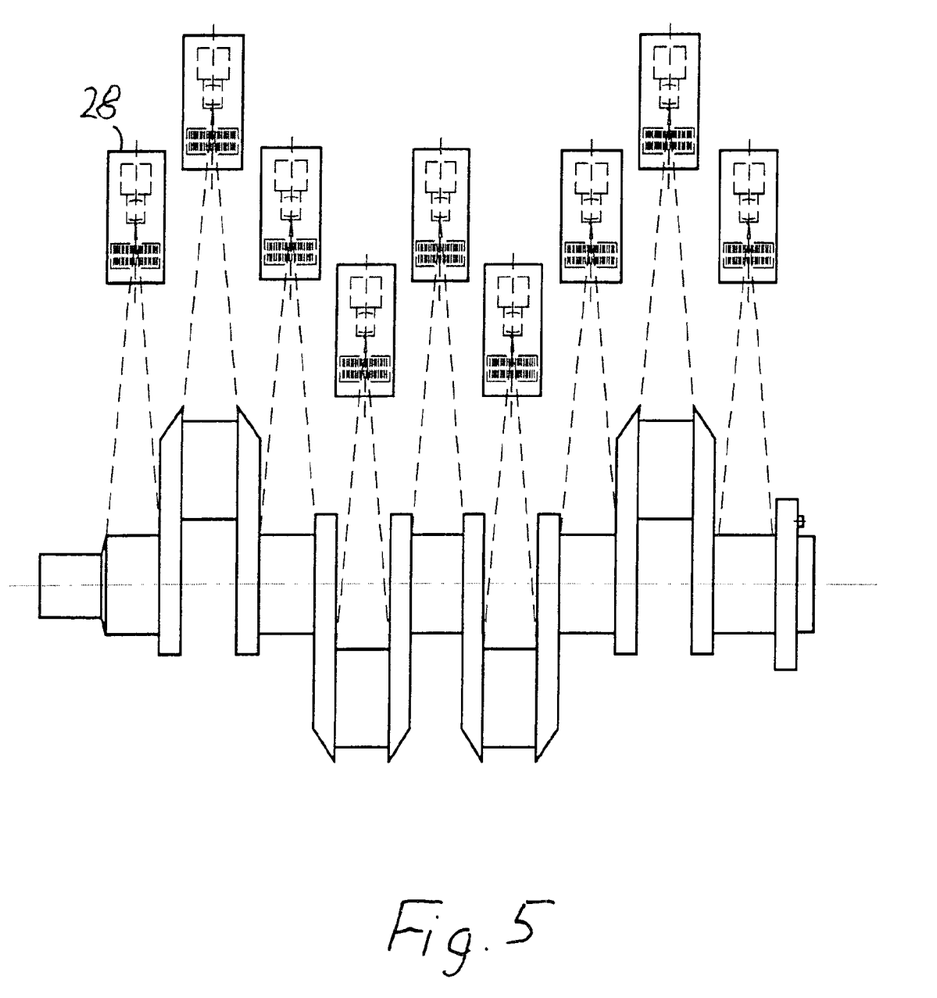
FIG. 5 shows, in the same illustration as FIG. 1, a second embodiment of a crankshaft testing device according to the invention.

FIG. 5 illustrates another embodiment of a device 4 according to the invention, which differs from the embodiment according to FIG. 1 in that a separate image sensor, for example in the form of a CCD camera, is associated with each bearing surface of the crankshaft 2 to be tested. For the sake of clarity, in addition to the CCD camera 18 which is associated with the pin bearing 8, only one additional CCD camera, associated with the main bearing 6, is provided with reference numeral 28 in FIG. 5.

In the illustrated embodiment, the CCD cameras 18, 28 as well as the crankshaft 4 are stationarily mounted during the testing operation. Since all CCD cameras 18, 28 are situated outside the interference contour of the crankshaft flanges, there is no risk of the device 4 according to the invention being damaged by the crankshaft 2.

A typical test sequence is completed in such a way that a loading gantry brings the crankshaft 4 into the testing position illustrated in FIG. 5. The CCD cameras 18, 28 then record an image of the associated bearing surface, which may take 0.5 sec, for example. The CCD cameras 18, 28 preferably have an internal memory for storing the recorded image. After the image has been recorded, the crankshaft 2 may be immediately transported further. The images from the CCD cameras 18, 28 may then be read one after the other and evaluated by the evaluation device 22. A very advantageous integration into the overall test sequence results due to the fact that the further transport of the crankshaft 2 and the evaluation of the images by the evaluation device 22 may take place at the same time.

In a modification of the embodiment according to FIG. 5, a single CCD camera 18 may be used to test all bearing surfaces of the crankshaft 2. In this case, however, a relative motion of the camera 18 and the crankshaft 2 with respect to one another is necessary.

The invention claimed is:

1. Crankshaft testing method for the classification testing of at least one bearing surface of a crankshaft, wherein:
   a) a reflection of a reference line pattern at the bearing surface to be tested (reflection image) is detected by at least one sensor, using a sensor system, the reference line pattern having a plurality of lines which are spaced apart from one another, and the reference line pattern is imaged over the at least one bearing surface, the reference line pattern being imaged over the at least one bearing surface of the crankshaft to be examined in such a way that the lines extend, at least approximately, in the circumferential direction of the bearing surface,
   b) the detected reflection image is evaluated with regard to its contrast, and
   c) the crankshaft is classified as "unsatisfactory" when the contrast is below one of a predefined and a predefinable threshold value.

2. Crankshaft testing method according to claim 1, wherein the reference line pattern is a pattern which is periodic along at least one axis.

3. Crankshaft testing method according to claim 1, wherein at least one of the reference line pattern and the distance of the reference line pattern from the bearing surface to be tested is selected in such a way that for an unfinished bearing surface a contrast of the reflection image results which is below an additional threshold value.

4. Crankshaft testing method according to claim 1, wherein the at least one sensor includes at least one digital image sensor.

5. Crankshaft testing method according to claim 1, wherein at least two bearing surfaces of the crankshaft are tested, and an image sensor of the at least one sensor of the sensor system is associated with each bearing surface of the at least two bearing surfaces to be tested.

6. Crankshaft testing device for the classification testing of at least one bearing surface of a crankshaft,
   a) having a sensor system having at least one sensor for detecting a reflection of a reference line pattern at the bearing surface to be tested (a reflection image), the reference line pattern having a plurality of lines which are spaced apart from one another, and the reference line pattern is imaged over the at least one bearing surface, the reference line pattern being imaged over the at least one bearing surface of the crankshaft to be examined in such a way that the lines extend, at least approximately, in the circumferential direction of the bearing surface, and
   b) having an evaluation device for evaluating the detected reflection image with regard to its contrast, the evaluation device classifying the crankshaft as "unsatisfactory" when the contrast is below one of a predefined and a predefinable threshold value.

7. Crankshaft testing device according to claim 6, wherein the reference line pattern is a pattern which is periodic along at least one axis.

8. Crankshaft testing device according to claim 6, wherein one of the reference line pattern and the distance of the reference line pattern from the bearing surface to be tested is selected in such a way that for an unfinished bearing surface a contrast of the reflection image results which is below an additional threshold value.

9. Crankshaft testing device according to claim 6, wherein the sensor system has at least one digital image sensor.

10. Crankshaft testing device according to claim 6, wherein the sensor system has at least two image sensors, each of which is associated with a bearing surface to be tested.

11. Use of the crankshaft testing device according to claim 6, for carrying out a crankshaft testing method for the classification testing of at least one bearing surface of a camshaft.

12. Use of the crankshaft testing device according to claim 6, for carrying out a crankshaft testing method for the classification testing of at least one surface of a metal component which is at least partially rotationally symmetrical.

* * * * *